April 8, 1958  E. D. LAUER  2,830,146
DIRECTIONAL SIGNAL SWITCH MECHANISM
Filed March 1, 1955  2 Sheets-Sheet 1

INVENTOR
EUGENE D. LAUER
BY *Townsend & Beaman*
ATTORNEY

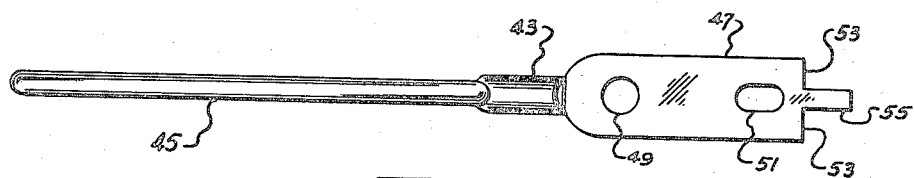
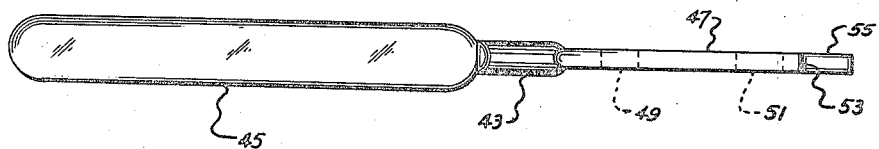
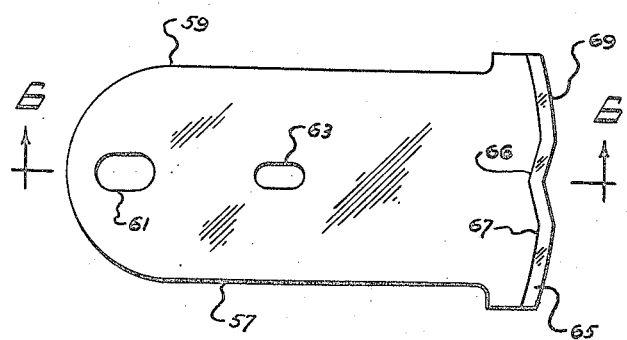
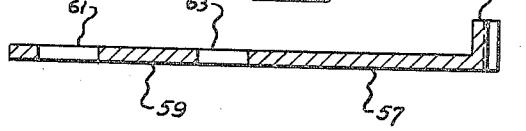

United States Patent Office 2,830,146
Patented Apr. 8, 1958

2,830,146

DIRECTIONAL SIGNAL SWITCH MECHANISM

Eugene D. Lauer, Jackson, Mich., assignor to The Sparks-Withington Company, Jackson, Mich., a corporation of Ohio Application March 1, 1955, Serial No. 491,359

5 Claims. (Cl. 200—61.37)

The present invention relates to direction signalling devices for automotive vehicles, and more particularly to devices of this type which are automatically resetting or self-cancelling.

Heretofore, the art of direction signalling devices has sought to provide such devices that would be dependable in operation and yet compact and simple in construction. In an effort to provide a self-cancelling automatically resetting signal device, it has been proposed to mount the cancelling wheel assembly which contacts the steering wheel in such a manner as to make it selectively engageable with the steering wheel for selective actuation of the cancelling mechanism, as disclosed for example in U. S. Patent No. 2,611,047, September 16, 1952, to E. L. Barcus. However, it was found in operation that such devices were difficult to adjust. The chief difficulty of devices such as those disclosed by the above patent lay in the necessity for shifting the position of the wheel bodily while at the same time maintaining it in operative contact with the working parts. Accordingly, it was proposed to mount the cancelling wheel on a fixed axis and to provide the operating member with a resiliently mounted part adjustably engageable with a portion of the cancelling wheel, as disclosed for example in U. S. Patent No. 2,604,560, July 22, 1952, to H. G. Dibelka. Moreover, it was found that devices constructed according to this latter patent were relatively bulky.

Although many other attempts were made to overcome the foregoing difficulties and other disadvantages, none, as far as I am aware, was entirely successful when carried into practice commercially on an industrial scale.

Accordingly, it is an object of the present invention to provide a direction signalling device for motor vehicles and the like, so constructed and arranged as to insure firm engagement of the operative parts in all positions of use.

Another object of the invention is to provide a direction signalling device which cannot become misaligned in operation.

The invention also contemplates providing a direction signalling device in which the parts are so constructed and arranged as to occupy a minimum of space.

It is a further object of the invention to provide a direction signalling device in which the parts are so simplified in construction and reduced in number as to reduce the cost of the unit and enable ready assembly and installation thereof.

Finally, it is an object of the present invention to provide a direction signalling device which will be simple and efficient in operation and rugged and durable in use.

Other objects and advantages will become apparent from the following description taken in conjunction with the accompanying drawings, in which:

Figure 3 shows a plan view of the operating member of the device of Figures 1 and 2;

Figure 4 is an elevational view of the operating member of Figure 3;

Figure 5 is a plan view of the friction gear member of the device of Figures 1 and 2; and Figure 6 is an elevational section view of the friction gear member, taken on the line 6—6 of Figure 5.

Figure 1:
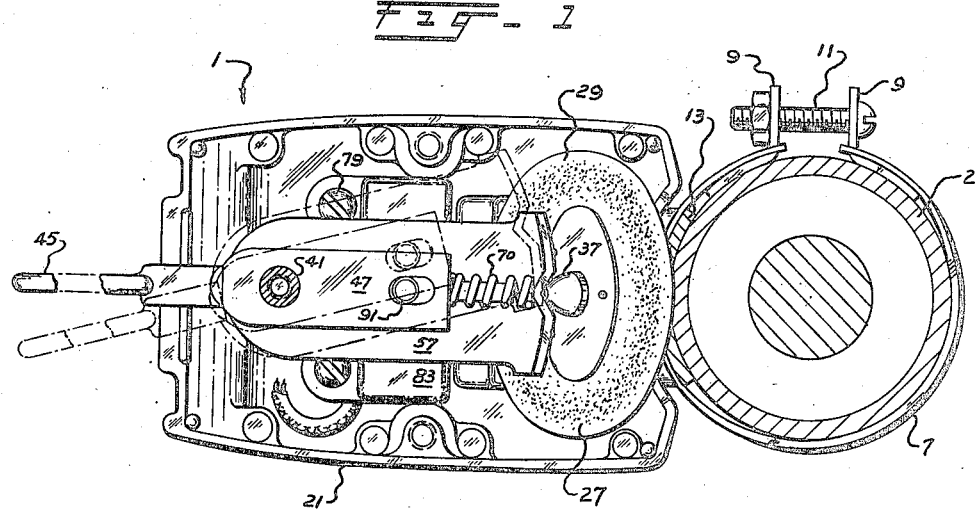
Figure 1 is a plan view of a direction signalling device according to my invention, with the cover removed and certain parts broken away in order more clearly to show the essential parts of the device.
Figure 2:
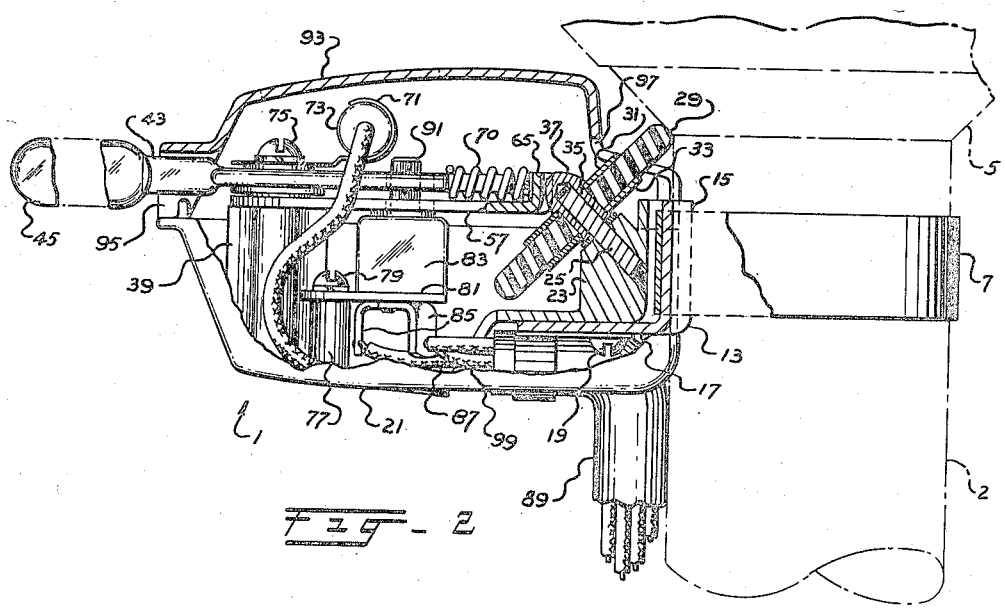
Figure 2 depicts a direction signalling device according to my invention in side elevation with certain parts broken away in order to show the novel structure thereof.

Referring now to the drawings in greater detail, in Figures 1 and 2 I have shown a direction signalling device according to my invention indicated generally at 1, adapted to be attached to the steering column 2 of a motor vehicle or the like and to coact with the steering wheel 5 of the vehicle. A clamping band 7 encircles steering column 2 and is provided at its ends with clamping flanges 9 integral therewith which are drawn together and held tightly in the closest possible relationship by screw and nut assembly 11.

The device 1 is clamped to steering column 2 by means of band 7 through a bracket 13 having an upstanding arcuate arm 15 receivable between band 7 and steering column 2, and having a horizontal leg 17 provided with at least one elongated slot (not shown) extending toward and away from arm 15. At least one screw 19 is receivable in the elongated slot or slots and has screw threaded engagement with a portion of the base or support 21 of the signalling device.

As best seen by comparison of Figures 1 and 2, support 21 is in the general form of a dish, having adjacent one end thereof a first interior projection or boss 23 which is provided with an inclined cylindrical hole for the reception of a pin 25. Pin 25 forms the axle of a cancelling wheel assembly 27 comprising an annular wheel 29 of rubber or other elastic deformable material held tightly between upper and lower washers 31 and 33. This assembly of wheel and washers is mounted tightly on the shank portion of a hollow bearing sleeve 35 provided at its upper or outer side with a friction pinion 37 that tapers inwardly toward its outer end and is in the general form of a rounded cone. Members 29, 31, 33, 35 and 37 form an integral assembly, none of the parts of which is movable relative to the other. Cancelling wheel assembly 27 is preferably mounted for rotation on pin 25; but it will be understood that pin 25 may be rotatable with assembly 27 in boss 23. In either event, the axis of assembly 27, and hence of wheel 29, is fixed.

Support 21 is provided with a second boss 39 upstanding therefrom and adjacent the other end thereof, which bears at its upper end an upwardly extending, interiorly screw-threaded axle 41 on which is pivotally mounted operating member 43. As best seen in Figures 3 and 4, operating member 43 comprises an elongated bar having a flat handle 45 adjacent one end thereof and a flat portion 47 adjacent the other end thereof, the general plane of handle 45 and portion 47 being disposed at right angles to each other. Portion 47 is provided with a round hole 49 adjacent the inner end thereof and an elongated hole 51 adjacent the outer end thereof, and terminates outwardly in abutment shoulders 53. A locator pin 55 is integral with flat portion 47 and extends outwardly of the outer end thereof.

Friction gear member 57 is also mounted on axle 41 of boss 39 for pivotal movement in a plane parallel to but spaced below the plane of pivotal movement of operating member 43. As best shown in Figures 5 and 6, member 57 comprises a flat bar 59 provided with a first elongated hole 61 adjacent the inner end thereof, a second elongated hole 63 roughly medially thereof, and an upstanding flange 65 at the outer end thereof. Flange 65 is roughly arcuate except for depression 66 and is perpendicular to bar 59 at all points. The center of curvature of flange 65 lies within elongated hole 61. Flange 65 has an inner face 67 and an outer face or friction gear face 69, both of which are perpendicular to bar 59.

Returning now to Figures 1 and 2, I have shown a coil compression spring 70 surrounding pin 55 and extending between abutment shoulders 53 and inner face 67.

Also mounted on axle 41 of boss 39 is a spring clip bracket 71 for resiliently engaging and retaining a signal light 73. The entire assembly of members 57, 43 and 71 may be retained on axle 41, with such spacing washers as may be desired, by a screw 75 received in the upper end of interiorly screw-threaded axle 41. In Figure 1, I have omitted the showing of elements 71, 73 and 75, the better to show the operative relationship of the parts.

Also upstanding from support 21 is a third boss 77 interiorly receiving at its upper end a screw 79 for mounting thereon a switch bracket 81. Mounted on bracket 81 is a switch assembly 83 having right-turn contacts adjacent one end thereof, left-turn contacts adjacent the other end thereof, and a neutral position medially thereof. Switch assembly 83 may for example be of the type disclosed in the Dibelka patent cited above, or may be of any comparable construction in which "closed" positions are located at the ends of the switch and an "open" position is located medially of the switch. Switch assembly 83 is provided with depending terminals 85 to which are connected wires 87 which are led out of the housing of the signal device in the form of a bundle or sheath of wires 89. Switch assembly 83 is provided with an upstanding actuating stud which is movable longitudinally of the switch housing as seen in Figure 1, but which remains upright in all operative positions.

The entire signalling device is provided with a cover 93, of the general form of an inverted dish, which is roughly complementary to support 21 and defines therewith openings as at 95, 97 and 99 for the accommodation of operating member 43, wheel 29 and sheath of wires 89, respectively. Cover 93 and support 21 may be detachably held together by means of screws or the like, as desired.

The assembly of a device according to my invention may proceed as follows:

Beginning with support 21, on which are mounted switch assembly 83 and cancelling wheel assembly 27, friction gear member 57 may be inserted in a horizontal position with axle 41 received in first elongated hole 61 and actuating stud 91 of switch assembly 83 received in second elongated hole 63. Atop this, operating member 43 is added, with axle 41 received in round hole 49 and actuating stud 91 received in elongated hole 51. Coil compression spring 70 may then be fed over locator pin 55, compressed tightly thereon, and then permitted to spring back into contact with inner face 67 of flange 65 of friction gear member 57. The compressive force of spring 70 will act between abutment shoulders 53 and inner face 67, tending to push operating member 43 to the left as seen in Figure 2 and friction gear member 57 to the right as seen in Figure 2. However, round hole 49 in operating member 43 substantially snugly fits axle 41, with the result that the operating member undergoes no longitudinal movement. On the other hand, elongated hole 61 of friction gear member 57 permits member 57 to slide longitudinally relative to axle 41, with the result that member 57 is forced to the right, as seen in Figure 2, until friction gear face 69 thereof comes into contact with a tapered side of friction pinion 37.

Spring clip bracket 71 may then also be added atop the assembly on axle 41 and screw 75 inserted and tightened so as to hold the assembly in place, yet not so tightly as to prevent pivotal movement of member 43 and pivotal and longitudinally sliding movement of member 57. Signal light 73 may then be snapped into place and cover 93 attached. In order to mount the assembled direction signalling device in proper position on the steering column of a motor vehicle or the like, bracket 13 is clamped firmly to steering column 2 by tightening screw and nut assembly 11 of clamping band 7. Support 21 is then laid on horizontal leg 17 and screw or screws 19 inserted through elongated slot or slots in leg 17 into support 21. Signalling device 1 is then pushed in toward steering column 2 until wheel 29 firmly engages a portion of steering wheel 5. Screw 19 is then tightened so as to lock the signalling device in the desired position and maintain firm contact between wheels 5 and 29.

The operation of the device is as follows:

When the motor vehicle or the like is being operated on a straight portion of road, all the parts will be in neutral position as shown in full line in Figure 1. Handle 45 will be centered, actuating stud 91 will be in medial or "open" position, friction pinion 37 will rest in depression 66, and there will be substantially no relative motion between wheels 5 and 29.

Assuming that it is desired to indicate a left turn, and that the signalling device is mounted to the right of the steering column, handle 45 will be pushed away from the driver to the phantom line position shown in Figure 1. This will cause the entire assembly of members 43, 57 and 70 to pivot counter-clockwise about axle 41 to the phantom line position shown in Figure 1; although in Figure 1 I have omitted the phantom line showing of members 55 and 70, in order to avoid a confusing multiplicity of broken lines. Actuating stud 91 projects through elongated hole 51 in member 43; and hence, counterclockwise pivotal movement of member 43 forces stud 91 out of "open" position into the "closed" position associated with the left turn circuit, which actuates the left turn signal through a flasher or other well known device. Stud 91 also extends through second elongated hole 63 in friction gear member 57; and hence, upward movement of stud 91 as seen in Figure 1 forces member 57 to pivot counterclockwise about axle 41. Thus, stud 91 insures that members 43 and 57 will always enjoy substantially the same pivotal movement. However, friction pinion 37 is seated in depression 66 of member 57; and friction pinion 37 is rotatable but laterally and longitudinally bodily immovable. Hence, in order that pinion 37 may leave depression 66, it is necessary that member 57 be forced inward against the pressure of spring 70, thereby sliding longitudinally relative to member 43 and the second axis comprising the axis of axle 41. Elongated hole 61 of member 57 accommodates this longitudinal sliding movement. During this movement of parts, members 43 and 57 remain parallel to each other and do not incline relative to their planes of pivotal movement.

When the indicated left turn is actually made, the steering wheel will be turned counterclockwise as seen in Figure 1. Since wheels 5 and 29 are in frictional rolling contact, wheel 29 will thus be forced to rotate about its fixed axis in a clockwise direction, as seen in Figure 1. Pinion 37 is effectively integral with wheel 29, with the result that pinion 37 will also rotate clockwise as seen in Figure 1 and will thus tend to urge friction gear member 57, with which it is in rolling frictional contact along friction gear face 69, even farther counterclockwise as seen in Figure 1. However, counterclockwise movement of handle 45 already moved member 43 into its extreme counterclockwise position, and with it member 57, so that pinion 37 merely slides on friction gear face 69 without moving it any farther toward the top of Figure 1 as seen therein.

However, when the left turn is completed and the wheel is returned for straight driving, steering wheel 5 is turned clockwise as seen in Figure 1, wheel 29 counterclockwise and with it friction pinion 37, so that member 57 is urged in a clockwise direction to return to neutral position. In effect, pinion 37, in frictional engagement with face 69, rolls member 57 back into neutral position, until pinion 37 is once more seated in depression 66. When member 57 returns to neutral position, it carries with it stud 91 to "open" position, which cancels the left turn signal by opening the left turn circuit. At the same time, stud 91 carries with it operating member 43, which returns handle 45 to neutral position.

The sequence of operation with regard to a right turn is the exact opposite of that just described; and hence, it will be unnecessary to recite it in detail. Signal light 73 may be in the left turn circuit or the right turn circuit, or both, so as to give a visual indication to the driver of the condition of his direction signals.

Thus, it will be seen that I have provided a direction signalling device in which the axis of the cancelling wheel assembly is fixed, so that the cancelling wheel may not become disengaged from the steering wheel and so that positive operation may be experienced at all times. It will also be seen that the taper of the friction pinion 37 coacts with the perpendicular friction gear face 69 to provide firm abutting contact between these friction gear portions. Furthermore, it will be noted that the arrangement of friction gear face 69 perpendicular to member 57 assures that the force pressing face 69 against pinion 37 will act perpendicular to face 69 and parallel to member 57. In this way, the forces assuring interengagement of the parts are applied in the most efficient manner; while at the same time, a great saving of space is effected in that it is not necessary to provide for movement of the parts out of their planes of pivotal movement.

It will also be noted that I have provided a direction signalling device in which the operative portions of the operating member and friction gear member overlie each other and are parallel to each other, thus assuring efficient operation and a great saving of space.

Finally, it should be noted that I have provided a device of such simple and efficient construction that actuation of either the operating member or the friction gear member will operate the other member through the agency of the actuating stud of the switch assembly.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A direction signalling device comprising a support, a wheel mounted on said support for rotation about a fixed shaft and having a friction pinion rotatable therewith, an operating member mounted on said support for pivotal movement about a second fixed shaft, an electrical switch mounted for actuation by said operating member, an elongated friction gear member mounted on said support independently of said operating member for pivotal movement about and limited longitudinal sliding movement relative to said second fixed shaft, a pin and slot drive connection between said members, a pin and slot connection between said gear member and said second shaft, and means resiliently urging said friction gear member with longitudinal sliding movement into contact with said friction pinion.

2. A direction signalling device comprising a support, a wheel mounted on said support for rotation about a shaft and having a friction pinion rotatable therewith, an operating member mounted on said support for pivotal movement about a second shaft, an electrical switch mounted for actuation by said operating member, an elongated friction gear member mounted on said support for pivotal movement about and limited longitudinal sliding movement relative to said second axis through a pin and slot connection through said second shaft, and means acting between said operating member and said friction gear member and resiliently urging said friction gear member to slide longitudinally relative to said second shaft into contact with said friction pinion.

3. A direction signalling device comprising a support, a wheel mounted on said support for rotation about a fixed axis and having a friction pinion rotatable therewith, an operating member comprising a bar pivotally mounted intermediate its length on said support for pivotal movement about a second axis, an electrical switch mounted for actuation by said operating member, an elongated friction gear member mounted on said support for pivotal movement about and bodily longitudinal sliding movement relative to said second axis and having a pin and slot connection with said support, said second axis passing through said elongated friction gear member adjacent an end thereof, and means resiliently located between said second axis and said friction gear to urge said friction gear member to slide longitudinally relative to said second axis into contact with said friction pinion.

4. A direction signalling device comprising a support, a wheel mounted on said support for rotation about a fixed axis and having a friction pinion rotatable therewith tapering inwardly toward its outer end, an operating member comprising a bar pivotally mounted intermediate its length on said support for pivotal movement about a second axis, said fixed axis and second axis being inclined relative to each other, an electrical switch mounted for actuation by said operating member, an elongated friction gear member mounted on said support for pivotal movement about and limited longitudinal sliding movement relative to said second axis and having a friction gear face perpendicular to said second axis, said second axis passing through said elongated friction gear member adjacent an end thereof, and means resiliently urging said friction gear member to slide longitudinally relative to said second axis until said friction gear face comes into contact with a tapered side of said friction pinion.

5. A direction signalling device comprising a support, a wheel mounted on said support for rotation about a fixed axis and having a friction pinion rotatable therewith, an operating member mounted on said support for pivotal movement about a second axis, an electrical switch mounted for actuation by said operating member, an elongated friction gear mounted adjacent one end of said support parallel to said operating member for pivotal movement about said axis and having at its outer end a friction gear flange disposed on the same side of said friction gear member as said operating member, means acting between said operating member and said friction gear flange resiliently to urge said friction gear flange into contact with said friction pinion, said operating member terminating short of said flange and said means comprising a compression spring disposed between the outer end of said operating member and the inner end of said flange, said spring being in the form of a coil, and a coil spring locator pin extending outwardly of the outer end of said operating member interiorly of said spring coil.

References Cited in the file of this patent

UNITED STATES PATENTS

| | | |
|---|---|---|
| 2,308,108 | Roedding | Jan. 12, 1943 |
| 2,604,560 | Dibelka | July 22, 1952 |
| 2,639,343 | Donley | May 19, 1953 |
| 2,676,218 | Augenstein | Apr. 20, 1954 |
| 2,684,601 | Putterman | July 27, 1954 |
| 2,710,318 | Lapidus | June 7, 1955 |